May 8, 1951 W. J. HOLT, JR., ET AL 2,552,042
CONSTANT CURRENT REGULATOR
Filed Nov. 15, 1949
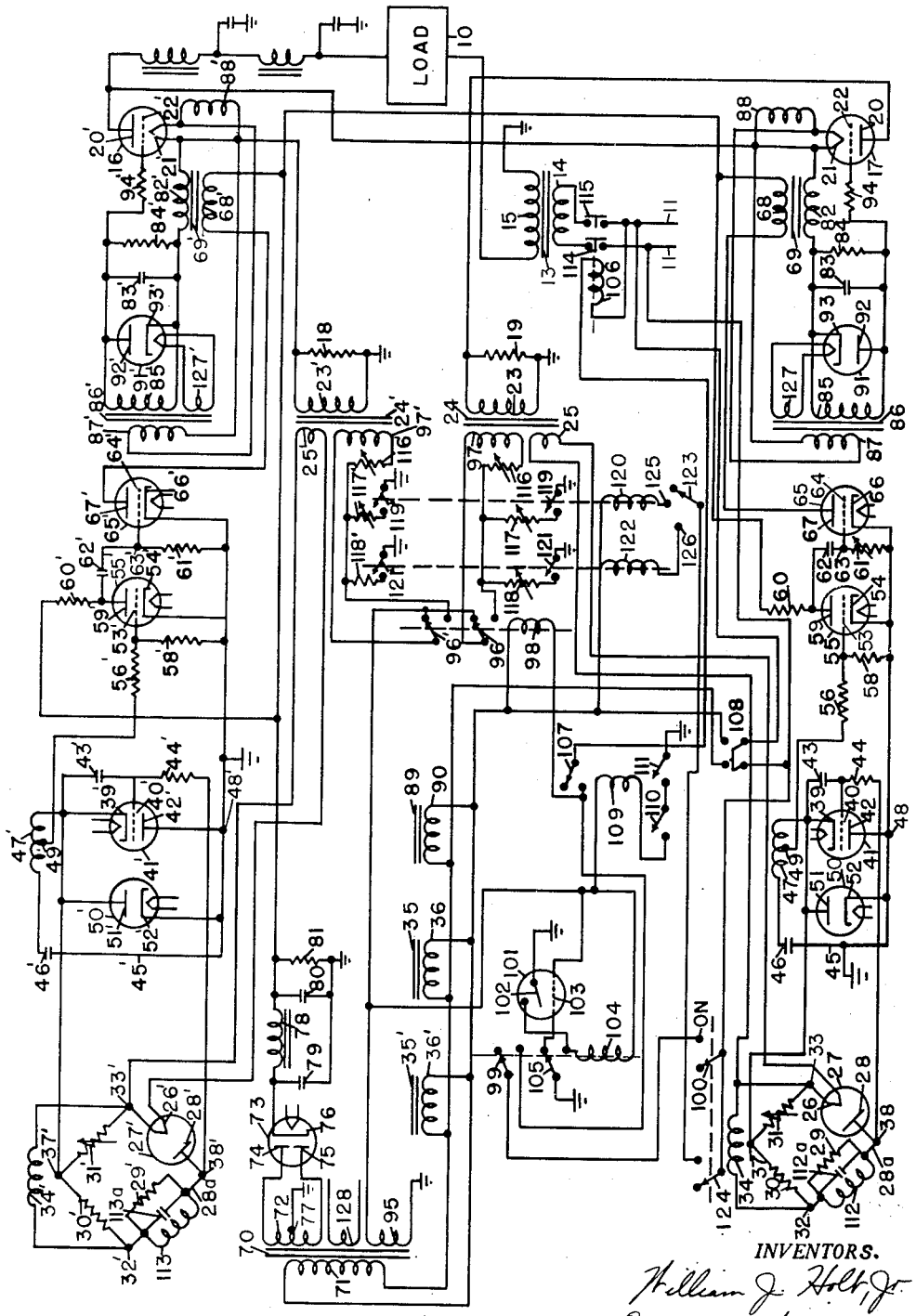
INVENTORS.
William J. Holt, Jr.
Darwin L. Whiteside Patented May 8, 1951

2,552,042

UNITED STATES PATENT OFFICE 2,552,042

CONSTANT CURRENT REGULATOR

William J. Holt, Jr., Garland, and Darwin L. Whiteside, Grapevine, Tex., assignors to Varo Mfg. Co., Inc., Garland, Tex., a corporation of Texas Application November 15, 1949, Serial No. 127,368

14 Claims. (Cl. 323—4)

Our invention relates to electric regulating and control circuits, and, more particularly, to electric regulating and control circuits for regulating the flow of current through an associated load circuit.

In many applications it is important to maintain a predetermined substantially constant current flowing through an alternating current load circuit. For example airport runway marker lights must maintain a constant brilliance and must, therefore, have a constant current flowing through them regardless of variations in the input voltage or in the load. Furthermore it is desirable to have a regulating apparatus which will regulate a current of any one of several predetermined values. The regulating apparatus must be capable of starting quickly and must be suitably protected against excessive overloads or failures within the current regulating apparatus itself.

Accordingly, it is an object of our invention to provide a new and improved electric regulating circuit.

It is another object of our invention to provide a new and improved regulating circuit for controlling an electrical condition of an associated load circuit.

It is another object of our invention to provide a new and improved electric regulating circuit for maintaining a substantially constant current in an associated load circuit.

It is another object of our invention to provide a new and improved electric regulating circuit for maintaining a preselected constant current in an associated load circuit.

It is another object of our invention to provide a new and improved electric control and regulating circuit having circuits for protecting the regulating and load circuits against overloads.

It is still another object of our invention to provide a new and improved electric regulating and control circuit for selecting and maintaining constant a current of predetermined value in an associated load circuit.

Briefly stated, in the illustrated embodiment of our invention, we provide a new and improved regulating and control circuit for controlling the current flowing in a load circuit which comprises a pair of electric valves, reversely connected in parallel, connected in series with an alternating current load circuit. Each electric valve conducts current in only one direction but since the electric valves are reversely connected in parallel both half cycles of the alternating current are transmitted to the load circuit. The electric valves each comprise an anode, a cathode and a control grid and the current flow through the load circuit is regulated by shifting the phase position of the grid potentials with respect to the anode potentials. A separate phase shifting control circuit is provided for each electric valve and each comprises a resistance connected in series with the anode-cathode circuit of its associated electric valve. The primary winding of a current sensing transformer is connected across the resistance and the secondary winding is connected to the heating circuit of an electric discharge means and changes the conductivity of the electric discharge means in accordance with the current flowing in the resistance. The electric discharge means constitutes one arm of a Wheatstone bridge and changes the balance of the Wheatstone bridge in accordance with the current flowing in the resistance. The unbalance voltage of the Wheatstone bridge is transmitted to a phase shifting bridge which shifts the phase of the unbalance voltage in accordance with the value of the unbalance voltage. The square wave output voltage of the phase shifting bridge is charged by a resistance-capacitance circuit into a peaked wave voltage which is amplified and then transmitted to the control grid of the electric valve. Since each electric valve is provided with its own Wheatstone and phase shifting bridges, each electric valve is independently controlled and both halves of the transmitted alternating current are closely regulated.

In order to provide a wide range in the value of the regulated current, a second secondary winding is provided on the current sensing transformers to vary the impedance of the transformer by a fixed amount and thus vary the conductivity of the electric discharge means by a fixed amount. Relay means protect the control and regulating circuit against overload conditions and against failure of components of the regulating and control circuits.

For a better understanding of our invention, reference may be had to the following description taken in connection with the accompanying drawing, and its scope will be pointed out in the appended claims. The single figure of the accompanying drawing diagrammatically illustrates an embodiment of my invention as applied to a system for maintaining a constant current through an alternating current load.

Referring now to the single figure of the accompanying drawing, we have diagrammatically illustrated our invention as applied to an alternating current load 10 which is energized from an alternating current supply circuit 11 through a transformer 13 having a primary winding 14 connected to the supply circuit 11. A secondary winding 15 is connected in series with the load 10, a pair of a parallel reversely connected electric valves 16 and 17, and resistances 18 and 19 which are connected in series relation with electric valves 16 and 17, respectively. Each of the electric valves 16 and 17 comprises an anode 20, a cathode 21 and a control grid 22, and may be of any of the several types well known in the art, although we prefer to employ valves of the gaseous discharge type. The cathode 21 of electric valve 17 is connected to the anode 20 of electric valve 16 and resistance 19 is connected to the anode 20 of electric valve 17 and to secondary winding 15. Resistance 18 is connected to cathode 21 of electric valve 16 and secondary winding 15. It will be apparent that an alternating current will flow through secondary winding 15 and the load 10. Each of the electric valves 16 and 17 transmits current in one direction only but since they are reversely connected in parallel valve 16 and resistance 18 will conduct one half cycle of the alternating current when valve 17 is nonconductive while valve 17 and resistance 19 will conduct the other half cycle of the alternating current when valve 16 is nonconductive. In this manner both half cycles of the alternating current are transmitted to load 10.

The effective current passed by each of the electric valves 16 and 17 may be regulated by controlling the phase of the potential impressed upon the control grids 22 of electric valves 16 and 17. By shifting the phase position of the potentials impressed on control grids 22 with respect to the potentials impressed on anodes 20, the period of conduction of each electric valve 16 and 17 can be changed.

The phase shift control means for electric valve 17 will now be described, it being understood that the phase shift control means for electric valve 16 is an exact duplicate of the control means of electric valve 17. The phase shift control means for electric valve 17 comprises resistance 19 across which is connected the primary winding 23 of a transformer 24. The secondary winding 25 of the transformer 24 is connected to cathode 26 of an electric discharge means 27 of the hot cathode type. Electric valve 27 is a diode and may be of any of the several well known types although we prefer to employ an electric valve 27 having an anode 28 and a cathode 26 which is made of a fine tungsten wire so that the temperature of the cathode 26 and the conductivity of electric valve 27 will vary with small changes of current, thus rendering electric discharge means 27 very sensitive to changes in the heating current in the cathode 26. Electric discharge means 27 constitutes one arm of a Wheatstone bridge 28a whose other three arms are formed by resistance 29 and its associated elements, to be described later, and resistances 30 and 31. Electric discharge means 27 functions as a negative resistance, i. e., a resistance having a negative resistance coefficient, since its resistance decreases as the current in cathode 26 increases. If extreme constancy of current in load 10 is not needed, a negative resistance, such as a carbon resistor, may be substituted for electric discharge means 27. A thermistor may also be substituted for electric discharge means 27 since the resistance of the thermistor decreases as its temperature increases.

A resistance having a positive resistance coefficient may also be substituted for electric discharge means 27 but in that case the output and input points of the Wheatstone bridge 28a would have to be interchanged.

Input points 32 and 33 of Wheatstone bridge 28a are supplied with alternating current from supply circuit 11 through a secondary winding 34 of a transformer 35 whose primary winding 36 is connected across supply circuit 11 while the output points 37 and 38 are connected to cathode 39 and control grid 40, respectively, of an electric discharge means 41, which also comprises an anode 42. Electric discharge means 41 may be of any of the several types well known in the art. A capacitance 43 is connected between the control grid 40 and cathode 39 in order to prevent oscillation of electric discharge means 41. In order to limit the current flow to control grid 40, a current limiting resistance 44 is interposed between output point 38 and control grid 40.

Electric discharge means 41 constitutes one arm of a phase shifting bridge 45. In addition to electric discharge means 41, the phase shifting bridge 45 comprises a capacitance 46 connected in series with electric discharge means 41 across a secondary winding 47 of transformer 35. The electrical midpoint 49 of secondary winding 47 and the common connection or junction 48 of capacitance 46 and the anode 42 of the electric discharge means 41 constitutes the output points or terminals of phase shifting bridge 45. An electric discharge means 50 is connected across electric discharge means 41 to act as a discharge path for capacitance 46 during the half cycle in which electric discharge means 41 is nonconductive. Electric discharge means 50 comprises an anode 51 and a cathode 52 and may be of any of the several types well known in the art.

The potential output between the output points 48 and 49 of phase shifting bridge 45 is connected between the control grid 53 and the cathode 54 of an electric discharge means 55 through a current limiting resistance 56. A resistance 58 connects grid 53 and cathode 54 in order to bias control grid 53 to a suitable potential. Electric discharge means 55, which amplifies the output of bridge 45, comprises an anode 59 and has its anode-cathode circuit connected across a source of direct current through a current limiting resistance 60.

The output of phase shift bridge 45 is of sine wave form while the control potential impressed on control grids 22 of electric valves 16 and 17 preferably should be of peaked wave form. The sine wave form output of bridge 45 is changed to a square wave form by electric discharge means 55. A wave shaping circuit comprising a serially connected variable resistance 61 and a condenser 62 are connected across the anode-cathode circuit of electric discharge means 55 to transform the square wave voltage output of electric discharge means 55 into a peaked wave voltage. The common connection or junction 63 of capacitance 62 and resistance 61 is connected to the control grid 64 of an electric discharge means 65. The side of resistance 61 not connected to control grid 64 is connected to the cathode 66 of electric discharge means 65 which also comprises an anode 67. The anode-cathode circuit of electric discharge means 65, which acts as an amplifier, is connected across a source of direct current through the primary winding 68 of a transformer 69.

The source of direct current for electric discharge means 55 and 65 is a rectifier circuit which comprises a transformer 70 having a primary winding 71 and a secondary winding 72 connected to a full wave rectifying electric discharge means 73. Electric discharge means 73 comprises a pair of anodes 74 and 75 and a cathode 76. The electrical midpoint 77 of secondary winding 72 is connected to ground while the opposite sides of winding 72 are connected to the anodes 74 and 75. A conventional filter comprising an inductance 78, a pair of capacitances 79 and 80, and a resistance 81 is connected between the cathode 76 and the load circuit of electric discharge means 73 to smooth out the direct current output of electric discharge means 73.

The amplified peaked wave form output of electric discharge means 65 is transmitted to the control grid 22 of electric valve 17 through the primary winding 68 and secondary winding 82 of transformer 69. Secondary winding 82 has one side connected to cathode 21 while the other side is connected to control grid 22 through a capacitance 83, a resistance 84 and the secondary winding 85 of a transformer 86. Primary winding 87 of transformer 86 is connected across the secondary winding 88 of a transformer 89 which has a primary winding 90 connected across supply circuit 11. An electric discharge means 91 comprising an anode 92 and a cathode 93 is connected across secondary winding 85 and functions as a rectifier to provide a biasing potential for control grid 22 through a current limiting resistance 94. The output of electric discharge means 91 is smoothed out by capacitance 83 and resistance 84 which constitute a filter circuit.

Winding 88 provides heating current for the filament cathode 21 of electric valve 17 and must be insulated for high voltage since cathode 21 is connected to the secondary winding 15 of transformer 13 and a high potential gradient therefore exists between secondary winding 88 and primary winding 90. If primary winding 87 were connected across supply circuit 11 or were a secondary winding of transformer 89, it also would have to be insulated for high voltage. By connecting primary winding 87 across secondary winding 88 the need for high voltage insulation of winding 87 is eliminated.

The regulating circuit of electric valve 16 is an exact duplicate of the regulating circuit of electric valve 17 and each element of the regulating circuit of electric valve 16 is provided with the primed reference character of the corresponding element of the regulating circuit of electric valve 17. Each element of the regulating circuit of electric valve 17 is duplicated in the regulating circuit of electric valve 16 except that electric discharge means 73 is a common source of direct current for electric discharge means 55 and 55' and 65 and 65'. Also primary winding 90 of transformer 89 is the common source of alternating current for windings 88 and 88'. Since the regulating circuits of electric valves 16 and 17 are identical in every respect, no further description of the regulating circuit of electric valve 16 will be given. The above described regulating circuits operate to maintain a substantially constant current flowing through load 10. The alternating current supply circuit 11 supplies an alternating current to primary winding 14 of transformer 13 and induces a high voltage alternating current in secondary winding 15 which flows through the load 10. Alternate half cycles of the current flowing through load 10 will be transmitted through each of the electric valves 16 and 17, one electric valve 16 or 17 being nonconductive during the half cycle during which the other electric valve 16 or 17 is conductive. The amount of current flowing through the load and one of the electric valves 16 and 17, say electric valve 17, during the half cycle in which electric valve 17 is conductive can be controlled by controlling the time at which the potential impressed on control grid 22 reaches a value in excess of the critical value necessary to render valve 17 conductive. For example, if the potential impressed on grid 22 exceeds the critical value at the beginning of the half cycle, the electric valve 17 will conduct current during the full half cycle. If the application of a potential exceeding the critical value to control grid 22 is delayed, electric valve 17 will conduct current only during the portion of the half cycle succeeding the application of the potential. In order to shift the phase of the potential impressed on the control grid 22 with respect to the phase of the positive potential impressed on anode 20 in accordance with the changes in the current flowing through load 10, the change in the voltage drop across resistance 19 caused by the change in the current in load 10 and resistance 19 is utilized to change the resistance of electric discharge means 27 in accordance with the temperature of cathode 26. The heating current flowing through the filament cathode 26 is supplied by the secondary winding 25 of transformer 24 and therefore varies in accordance with the voltage drop across resistance 19. For example, if the current in resistance 19 decreases, the voltage in secondary winding 25 decreases and less heating current flows through cathode 26. The temperature of cathode 26 will therefore decrease and the resistance of the anode-cathode circuit of electric discharge means 27 will increase. Since the anode-cathode resistance of electric discharge means 27 constitutes one arm of the Wheatstone bridge circuit 28a, the balance of bridge circuit 28a will be changed causing a change in the potential between output points 37 and 38. The output potential of bridge 28a being impressed on control grid 40 of electric discharge means 41, the resistance of the electric discharge means 41 is also changed and since electric discharge means 41 constitutes one arm of the phase shift bridge 45 the phase of the potential between output points 49 and 48 is advanced a fraction of a half cycle. The advanced sine wave output voltage of phase shifting bridge 45 is applied between the control grid 53 and the cathode 54 of electric discharge means 55 which amplifies the potential impressed on control grid 53. The amplified square wave output voltage is transmitted through the resistance 61 and capacitance 62 circuit which changes the square wave into a peaked wave voltage. The peaked wave voltage is impressed on control grid 64 of electric discharge means 65 which amplifies the peaked wave form voltage impressed on control grid 64 and transmits it to the primary winding 68 of transformer 69. The secondary winding 82 transmits the peaked wave potential to the control grid 22 of electric valve 17 primarily through capacitance 83 and causes electric valve 17 to fire. Since the phase of the potential impressed on control grid 22 has been advanced by phase shift bridge 45, electric valve 17 fires at an earlier time during the half cycle in which it is conductive. A decrease in current flowing through load 10 and resistance 19 thus advances the phase of the potential impressed on control grid 22 with respect to the phase position of the potential impressed on anode 20 and causes more current to flow through resistance 19 and load 10. An increase in the current flowing in load 10 and resistance 19 will retard the phase of the potential impressed on control grid 22 and will therefore, decrease the amount of current flowing in load 10 and resistance 19. By selecting proper values for the various elements of the control circuit the phase of the potential impressed on control grid 22 can be so varied in accordance with the current flowing in resistance 19 as to maintain the current in resistance 19 and load 10 substantially constant.

Electric valve 16 is controlled in exactly the same manner as electric valve 17 but it is conductive only during the half cycle when electric valve 17 is nonconductive. Since each valve 16 and 17 has its own control circuit which functions during alternate half cycles of the alternating current induced in secondary winding 15, the current flowing in both half cycles of the alternating current induced in secondary winding is regulated and the current flowing through load 10 is maintained constant. Separate regulating circuits for electric valves 16 and 17 are employed in order that the current conducted by each electric valve 16 and 17 can be separately controlled to allow adjustment of the electrical elements in the regulating circuit of either tube to achieve perfect balance in the amount of current transmitted in each half cycle of the alternating current flowing in load 10.

It will be noted that the resistance of electric discharge means 27 and 27' is greatest when their cathodes 26 and 26' are cold and that the potentials impressed on the anodes 20 and control grids 22 will therefore be substantially in phase when cathodes 26 and 26' are cold. Electric valves 16 and 17 will therefore transmit a maximum current to load 10 when cathodes 26 and 26' are cold. In order to prevent an initial high current surge upon initiation of operation, it is necessary to warm up cathodes 26 and 26' before electric valves 16 and 17 and load 10 are connected to supply circuit 11 through transformer 13.

The connection of the anode-cathode circuit of electric valves 16 and 17 must also be delayed until the electron emission surfaces of the cathodes 21 have been brought to their normal operating temperature. In order to ensure a proper warm up of cathodes 26 and 26', we provide a secondary winding 95 on transformer 70 which is connected through contacts 96 and 96' to windings 97 and 97' on transformers 24 and 24' respectively. A relay winding 98 for actuating contacts 96 and 96' is connected across supply circuit 11 through a contact 99 and a switch 100. When contacts 96 and 96' are in the position illustrated in the drawing, an alternating current is transmitted from secondary winding 95 to winding 97 and 97' and induces an alternating current in windings 25 and 25' respectively, which warms up cathodes 26 and 26' respectively and which maintains cathodes 26 and 26' at a high temperature until contacts 96 and 96' are actuated by relay winding 98 and windings 97 and 97' are disconnected from secondary winding 95. The temperature of cathodes 26 and 26' thereafter depends on the current flowing in windings 23 and 23' respectively. Relay winding 98 is energized simultaneously with the connections of supply circuit 11 with the anode-cathode circuits of electric valves 16 and 17. A time delay relay 101 which may comprise a bimetallic contact 102 and a heating resistance 103 is connected across secondary winding 95 to control the energization of a relay winding 104 which actuates a pair of contacts 99 and 105. Contact 105 merely locks-in contact 99 by providing a ground return for relay winding 104 when contact 102 is actuated. Heating resistance 103 is disconnected at the same time from ground and therefore from the heating current.

With contact 99 in its actuated position, a relay winding 106 is connected across supply circuit 11 provided that contact 107 is actuated and switches 100 and 108 are closed. Contact 107 is actuated by a relay winding 109 which is connected across secondary winding 95 through contact 110 and 111 which are actuated by relay windings 112 and 113, respectively. Relay windings 112 and 113 are connected across resistances 29 and 29' respectively. Capacitances 112a and 113a are connected across relay windings 112 and 113, respectively, to eliminate "chattering" of contacts 110 and 111, respectively. When cathodes 26 and 26' are cold, substantially no current flows through electric discharge means 27 and 27' and relay windings 112 and 113 therefore are not energized. Once cathodes 26 and 26' reach a predetermined temperature, relay winding 112 and 113, respectively, are energized and actuate contacts 110 and 111. Relay winding 106 actuates contacts 114 and 115 to connect primary winding 14 across supply circuit and this transmits current to load 10.

The mode of operation of the time delay and protective control circuit will now be described. At the initiation of operation of the unit, all switches and relays are in the positions illustrated in the drawing. Switch 108 is closed and alternating current from supply circuit 11 is transmitted to primary winding 71 of transformer 70, alternating current is induced in secondary winding 95 and transmitted to windings 97 and 97' of transformers 24 and 24' respectively. The alternating current in windings 97 and 97' induces alternating current in windings 25 and 25', respectively, and heating current is transmitted to cathodes 26 and 26', respectively. When cathodes 26 and 26' are sufficiently heated, sufficient current flows through relay windings 112 and 113 to actuate contacts 110 and 111, respectively. When contacts 110 and 111 are actuated, relay winding 109 is energized to actuate contact 107.

At the same time that windings 97 and 97' were energized, a heating current was transmitted to heating resistance 103 through contact 105. After a predetermined time interval, heating resistance 103 warms up bimetallic contact 102 and contact 102 is actuated to energize relay winding 104. Relay winding 104, when energized, actuates contacts 105 and 99. When actuated, contact 105 disconnects heating resistance 103 from secondary winding 95 and resistance 103 is allowed to cool off in order to lengthen its operative life. In addition, if time delay contact 102 were to remain in its actuated position throughout the period of operation of the current regulating circuit, contact 102 would remain in a heated condition. If switch 100 or switch 108 were opened for a very short period of time bimetallic contact 102 would not cool off and would remain closed placing a potential across the anode cathode circuits of electric valve 16 and 17 immediately after the switch 100 or switch 108 was closed. The cathodes 21 of electric valves 16 and 17, however, could cool off sufficiently during the short period of time switch 100 and 108 was open so as to be damaged by the immediate energization of the anode-cathode circuits of electric valves 16 and 17.

With switch 108 closed, and contacts 107, 99 and 105 in their actuated positions, cathodes 21 of electric valves 16 and 17 and cathodes 26 and 26' of electric discharge means 27 and 27' are in a heated condition and the apparatus is in a standby condition. When switch 100 is moved to the "on" position, relay windings 98 and 106 are energized and actuate contacts 96 and 96' and contacts 114 and 115, respectively. Contacts 114 and 115 connect primary winding 14 across supply circuit 11 thereby causing current to flow through electric valves 16 and 17 and load 10. Contacts 96 and 96', when actuated, disconnect windings 97 and 97', respectively, from secondary winding 95 and current is now induced in windings 25 and 25' by the current flowing in windings 23 and 23', respectively. The temperature of cathodes 26 and 26' is therefore determined by the current flowing through load 10 and resistances 19 and 18 and the current regulating circuit will maintain the current through the load substantially constant in the manner described above.

Should either of the electric discharge means 27 or 27' become inoperative due to a burned-out cathode filament 26 or 26' or to some other failure, current will cease flowing through relay winding 112 or 113, as the case may be and contact 110 or 111 will return to its original position. Relay winding 109 will then become deenergized and allow contact 107 to return to the position illustrated in the drawing. With contact 107 in its original position, relay winding 106 is disconnected from supply circuit 11 and allows contacts 114 and 115 to return to the position illustrated in the drawing. Primary winding 14 is then disconnected from supply circuit 11 and current ceases to flow through electric valves 16 and 17 and load 10. It is necessary to stop current flow through electric valves 16 and 17 and load 10 when either or both of electric discharge means 27 and 27' becomes inoperative for in that event their resistances become very great and would cause an excessive current to flow through load 10.

It is desirable to make the current regulating circuit capable of regulating any one of a number of pre-selected values of current through the load 10. The selection of a particular value of current to be maintained in the load 10 can be accomplished by changing the current transmitted to cathodes 26 and 26' of electric discharge means 27 and 27', respectively. The current in primary windings 23 and 23' is maintained substantially constant and therefore a change in the impedance of windings 23 and 23' will change the current induced in secondary windings 25 and 25', respectively. The impedance of windings 23 and 23' varies in accordance with the impedance of circuits comprising resistance 116 and winding 97 and resistance 116' and winding 97', respectively, since windings 97 and 97' are inductively coupled to windings 23 and 23'. The impedance of the circuits comprising resistance 116 and winding 97, and resistance 116' and winding 97' can in turn be varied by changing the resistances 116 and 116'. For example, if resistance 116 is increased, the impedance of transformer 24 is increased and the voltage across primary winding 23 is increased. The increase in voltage across winding 23 will increase the current induced in winding 25 and therefore the heating current transmitted to cathode 26. The increase in the temperature of cathode 26 will decrease the resistance of electric discharge means 27 and will cause a smaller current to flow through load 10 during the half cycle during which electric valve 17 is conductive. The amount of current transmitted by electric valve 16 during each half cycle of conductivity of electric valve 16 can be similarly varied by changing resistance 116'. Resistances 116 and 116' are variable resistances, in order to allow fine adjustments in the value of the current in load 10.

We provide resistances 117 and 118 each of which is adapted to be connected across resistance 116 and resistance 117' and 118' each of which is adapted to be connected across resistance 116'. Resistances 116, 117 and 118 differ in value in any predetermined manner, resistance 118 being the smallest and resistance 116 being the greatest. Resistances 116', 117' and 118' differ in like manner. The corresponding resistances 116 and 116', 117 and 117', and 118 and 118' are equal in order to ensure that equal amounts of current are transmitted by electric valves 16 and 17. Resistances 116 to 118 and 116' to 118' are variable in order to balance very closely the current transmitted by each of the electric valves 116 and 117.

A pair of contacts 119 and 119' are simultaneously actuated by a relay winding 120 to connect resistances 117 and 117' across resistances 116 and 116', respectively. Similar contacts 121 and 121' are energized by a relay winding 122 to simultaneously connect resistances 118 and 118' across resistances 116 and 116', respectively. Relay windings 120 and 122 are connected in parallel across supply circuit 11 through three way switches 123 and 124. When switch 123 is in the position illustrated in the drawing only resistances 116 and 116' are connected in the circuit which comprises windings 97 and 97' and current of a certain pre-determined value flows through load 10. When switch 123 is moved to contact position 125, resistances 117 and 117' are connected across resistances 116 and 117', respectively, thereby decreasing the impedance of transformers 24 and 24', decreasing the heating current in cathodes 26 and 26', and increasing the current through load 10. Upon switch 123 being moved to position 126, the impedance of transformers 24 and 24' will be further decreased and the current through load 10 will be further increased. While we have shown only two resistances adapted to be connected across each resistance 116 and 116', as many more resistances may be connected across resistances 116 and 116' as may be desired to provide a greater range of current values for load 10.

The heating elements of electric discharge means 91 and 91" are provided with heating current by windings 127 and 127' on transformers 86 and 86'. The heating elements of all other electric discharge means, except electric discharge means 27 and 27', are supplied with current from a secondary 128 on transformer 70. Heating current is supplied to electric discharge means 27 and 27' from secondary windings 25 and 25'.

The brightness of the airport runway marker lights can be varied from a point remote from the point of installation of the current regulating apparatus by connecting a duplicate of switch 103 in parallel with switch 103 and locating the duplicate switch at the remote point.

If the voltage of supply circuit is of sufficient magnitude to properly energize load 10, the transformer 13 may be unnecessary and the electric valves 16 and 17 may be connected directly across supply circuit 11. In this case a small step-down transformer may be necessary to supply voltage of proper magnitude for the regulating and control circuits of electric valves 16 and 17.

It will be apparent to those skilled in the art that the current regulating circuit described above can be used not only to regulate the current in airport runway marker lights but in other applications as well. For example, the current regulating circuit may be easily modified to control the temperature of an electric furnace by replacing electric discharge means 27 and 27' by photocells whose resistance will vary in accordance with the intensity of radiation from the electric furnace. The electric discharge means 27 and 27' can be replaced also by resistances imbedded in the walls of the furnace or otherwise positioned in or near the furnace so that their temperature will vary in accordance with the temperature of the furnace.

While we have shown and described a particular embodiment of our invention, it will be obvious to those skilled in the art that changes and modifications may be made in our invention and we, therefore aim in the appended claims to cover all such changes and modifications as fall within the true spirit and scope of our invention.

What we claim as new and desire to secure by Letters Patent of the United States is:

1. In combination: an alternating current supply circuit; an alternating current load circuit energized from said alternating current supply circuit; a pair of electric valves reversely connected in parallel in series with said load circuit, each of said electric valves comprising an anode, a cathode and a control grid; and individual controlling means for each of said electric valves comprising a resistance in series with the anode-cathode circuit of the controlled electric valve, a Wheatstone bridge having an electric discharge means in one of its arms, means responsive to variations in the current in said resistance for varying the resistance of said electric discharge means in accordance with the current in said resistance, a second electric discharge means comprising a control grid, a phase shifting bridge, said second electric discharge means comprising an arm of said phase shifting bridge, means for impressing the output voltage of said Wheatstone bridge on said control grid of said second discharge means to vary the resistance of said second electric discharge means and to shift the phase of said output voltage in accordance with the resistance of said first electric discharge means, means for transforming the wave form of the output voltage of said phase shifting bridge into peaked wave form, and means for impressing said peaked wave form voltage on said control grid of said controlled electric valve for controlling the period of conductivity of said controlled electric valve to maintain substantially constant current in said load circuit.

2. In combination: an alternating current supply circuit; an alternating current load circuit energized from said alternating current supply circuit; a pair of electric valves, reversely connected in parallel in series with said load circuit, each of said valves comprising an anode, a cathode and a control grid; and individual control means for each of said electric valves comprising a resistance in series with the anode-cathode circuit of the controlled electric valve, a Wheatstone bridge having a variable resistance in one arm, means responsive to variations in the current in said resistance for varying said variable resistance in accordance with the current in said resistance, a phase shifting bridge having a variable resistance in one arm, means for varying the said last mentioned variable resistance in accordance with the output voltage of said Wheatstone bridge, means for transforming the wave form of the output voltage of said phase shifting bridge into peaked wave form, and means for impressing the peaked wave form voltage on said control grid of said controlled electric valve to control the period of conductivity of said electric valve to maintain substantially constant current in said load circuit.

3. In combination: an alternating current supply circuit; an alternating current load circuit energized from said alternating current supply circuit; a pair of electric valves reversely connected in parallel in series with said load circuit, each of said valves comprising an anode, a cathode and a control grid; a phase shifting bridge having a variable resistance in one arm for each of said electric valves; means connected to the anode-cathode circuit of each of said valves for varying said variable resistance of its associated phase shifting bridge in accordance with the current transmitted by its associated electric valve, each phase shifting bridge impressing a potential on the control grid of its associated electric valve which varies in phase relation with respect to the anode-cathode voltage of its associated electric valve in accordance with the current transmitted by its associated electric valve to maintain substantially constant current in said load circuit.

4. In combination: an alternating current supply circuit; an alternating current load circuit energized from said alternating current supply circuit; a pair of electric valves reversely connected in parallel in series with said load circuit, each of said valves comprising a control member; means for impressing on said control members of said electric valves periodic voltages to render said electric valves periodically and alternately conductive; means for shifting the phase positions of said periodic voltages to vary the instant of initiation of conduction of each of said electric valves, said last mentioned means comprising a phase shifting bridge for each control member having a variable resistance in one of its arms; and current sensing means for detecting variations in the current in said load circuit for varying said variable resistances of said phase shifting bridges.

5. In combination: an alternating current supply circuit; an alternating current load circuit energized from said alternating current supply circuit; a plurality of electric valves reversely connected in parallel in series with said load circuit, each of said electric valves comprising a control member; means for impressing on said control members of said electric valves periodic voltages to render said electric valves periodically and alternately conductive; a current sensing means for each of said electric valves to detect variations in the current in said load circuit; a Wheatstone bridge connected to each of said current sensing means having a variable resistance in one arm whose resistance is varied in accordance with the current in said load circuit; and a phase shifting bridge having a variable resistance in one arm for shifting the phase positions of said periodic voltages to vary the instant of initiation of conduction of each of said electric valves, the output voltage of said Wheatstone bridge varying said last mentioned variable resistance in accordance with the resistance of said variable resistance of said Wheatstone bridge.

6. In combination: an alternating current supply circuit; an alternating current load circuit energized from said alternating current supply circuit; a plurality of electric valves reversely connected in parallel in series with said load circuit, each of said electric valves comprising a control member; means for impressing on said control members of said electric valves periodic voltages to render said electric valves periodically and alternately conductive; a current sensing means for each of said electric valves to detect variations in the current in said load circuit; a Wheatstone bridge connected to each of said current sensing means having an electric discharge means in one arm whose resistance is varied in accordance with the current in said load circuit; and a phase shifting bridge having a variable resistance in one arm for shifting the phase positions of said periodic voltages to vary the instant of initiation of conduction of each of said electric valves, the output voltage of said Wheatstone bridge varying said variable resistance in accordance with the resistance of said electric discharge means.

7. In combination: an alternating current supply circuit; an alternating current load circuit energized from said alternating current supply circuit; a plurality of electric valves reversely connected in parallel in series with said load circuit, each of said electric valves comprising a control member; means for impressing on said control members of said electric valves periodic voltages to render said electric valves periodically and alternately conductive; a current sensing means for each of said electric valves to detect variations in the current in said load circuit; a Wheatstone bridge connected to each of said current sensing means having an electric discharge means in one arm whose resistance is varied in accordance with the current in said load circuit; and a phase shifting bridge having an electric discharge means in one arm for shifting the phase positions of said periodic voltages to vary the instant of initiation of conduction of each of said electric valves, the output voltage of said Wheatstone bridge varying the resistance of said last mentioned electric discharge means in accordance with the resistance of said first mentioned electric discharge means.

8. In combination: an alterating current supply circuit; an alternating current load circuit; a pair of electric valves reversely connected in parallel between said supply circuit and said load circuit, each of said electric valves comprising an anode, a cathode and a control member; means for sensing the current in said load circuit; a Wheatstone bridge having a variable resistance in one arm operatively associated with said last mentioned means for varying said variable resistance in accordance with the current in said load circuit; phase shifting means operatively associated with said Wheatstone bridge for shifting the phase of the potential impressed on said control grids of said electric valves in accordance with the current in said load circuit; and means to selectively vary said variable resistance in a predetermined manner for changing the value of current to be maintained in said load circuit.

9. In combination: an alternating current supply circuit; an alternating current load circuit; a pair of electric valves reversely connected in parallel between said supply circuit and said load circuit, each of said electric valves comprising an anode, a cathode and a control grid; and individual current regulating means for each of said electric valves, each of said regulating means comprising a resistance in series with the anode-cathode circuit of its associated electric valve, a current sensing transformer having a primary winding connected across said resistance, a Wheatstone bridge circuit having a variable negative resistance in one arm, a secondary winding on said transformer connected to said variable negative resistance, means operatively associated with said transformer to vary the impedance of said transformer for selecting a particular value of current to be maintained in said load circuit; and means responsive to the output of said Wheatstone bridge for shifting the phase of the potential impressed on said control grid of said associated electronic valve in accordance with the current in said load circuit.

10. In combination: an alternating current supply circuit; an alternating current load circuit; a pair of electric valves reversely connected in parallel between said supply circuit and said load circuit, each of said electric valves comprising an anode, a cathode and a control grid; and individual current regulating means for each of said electric valves, each of said regulating means comprising a resistance in series with the anode-cathode circuit of its associated electric valve, a current sensing transformer having a primary winding connected across said resistance, a Wheatstone bridge circuit having a variable resistance in one arm, a secondary winding on said transformer connected to said variable resistance, a second secondary winding on said transformer and a variable resistance in series with said second secondary winding for varying the impedance of said transformer for selecting a particular value of current to be maintained in said load circuit, and means responsive to the output of said Wheatstone bridge for shifting the phase of the potential impressed on said control grid of said associated electronic valve in accordance with the current in said load circuit.

11. In combination: an alternating current supply circuit; an alternating current load circuit; a pair of electric valves reversely connected in parallel between said supply circuit and said load circuit, each of said electric valves comprising an anode, a cathode and a control grid; and individual current regulating means for each of said electric valves, each of said regulating means comprising a resistance in series with the ande-cathode circuit of its associated electric valve, a current sensing transformer having a primary winding connected across said resistance, a Wheatstone bridge circuit having a variable resistance in one arm, a secondary winding on said transformer connected to said variable resistance, a second secondary winding on said transformer and a variable resistance in series with said second secondary winding for varying the impedance of said transformer for selecting a particular value of current to be maintained in said load circuit, a plurality of resistances adapted to be connected across said variable resistance for varying the impedance of said transformer a predetermined amount for selecting a particular value of current to be maintained in said load circuit, and means responsive to the output of said Wheatstone bridge for shifting the phase of the potential impressed on said control grid of said associated electronic valve in accordance with the current in said load circuit.

12. In combination: an alternating current supply circuit; an alternating current load circuit; a pair of electric valves reversely connected in parallel between said supply circuit and said load circuit, each of said electric valves comprising an anode, a cathode and a control grid; and individual current regulating means for each of said electric valves, each of said regulating means comprising a resistance in series with the anode-cathode circuit of its associated electric valve, a current sensing transformer having a primary winding connected across said resistance, a Wheatstone bridge circuit having a negative resistance in one arm, a secondary winding on said transformer connected to said negative resistance, a second secondary winding on said transformer and a variable resistance in series with said second secondary winding, means to initially energize said second secondary winding for inducing a current in said secondary winding and for decreasing said negative resistance, means for short circuiting said second secondary winding through said variable resistance after said negative resistance has been decreased a predetermined degree, said second secondary winding and said variable resistance being a means for varying the impedance of said transformer to select a particular value of current to be maintained in said load circuit, and means responsive to the output of said Wheatstone bridge for shifting the phase of the potential impressed on said control grid of said associated electronic valve in accordance with the current in said load circuit.

13. In combination: an alternating current supply circuit; an alternating current load circuit energized from said alternating current supply circuit; a pair of electric valves reversely connected in parallel in series with said load circuit, each of said valves comprising an anode, a cathode and a control grid; and individual control means for each of said electric valves comprising a resistance in series with the anode-cathode circuit of the controlled electric valve, a Wheatstone bridge having an electric discharge means in one arm, said electric discharge means being provided with a cathode, means responsive to variations in the current in said resistance for varying the temperature of said last mentioned cathode in accordance with the current in said resistance, and a phase shifting bridge having a variable resistance in one arm means for varying said variable resistance in accordance with the output voltage of said Wheatstone bridge, each phase shifting bridge impressing a potential on the control grid of its associated electric valve which varies in phase relation with respect to the anode-cathode voltage of its associated electric valve in accordance with the current transmitted by its associated electric valve to maintain the current in said load circuit substantially constant.

14. In combination: an alternating current supply circuit; an alternating current load circuit energized from said alternating current supply circuit; a pair of electric valves reversely connected in parallel in series with said load circuit, each of said valves comprising an anode, a cathode and a control grid; and individual control means for each of said electric valves, each of said control means comprising a phase shifting means for impressing on the control grid of its associated electric valve a potential variable in phase relation with respect to the voltage of the anode-cathode circuit of its associated electric valve, and means responsive to variations in the current transmitted by its associated electric valve connected to said phase shifting means for shifting the phase of the potential impressed on the control grid of its associated electric valve in accordance with the current transmitted by its associated electric valve to maintain substantially constant current in said load circuit, said last mentioned means comprising an electric discharge means having a cathode and means for varying the temperature of said last mentioned cathode in accordance with the current transmitted by the associated electric valve.

WILLIAM J. HOLT, Jr.
DARWIN L. WHITESIDE.

REFERENCES CITED

The following references are of record in the file of this patent:

UNITED STATES PATENTS

| Number | Name | Date |
|---|---|---|
| 2,246,178 | Levoy | June 17, 1941 |
| 2,355,453 | Livingston | Aug. 8, 1944 |
| 2,393,884 | Callender | Jan. 29, 1946 |
| 2,458,649 | Ringer, Jr., et al. | Jan. 11, 1949 |